(12) United States Patent
James

(10) Patent No.: US 7,585,908 B1
(45) Date of Patent: Sep. 8, 2009

(54) ANOMALY CONTROL COMPOSITIONS FOR WRINKLE FINISH POWDER COATINGS

(75) Inventor: Joseph H. James, Brookfield, WI (US)

(73) Assignee: Hentzen Coatings, Inc., Milwaukee, WI (US)

( * ) Notice: Subject to any disclaimer, the term of this patent is extended or adjusted under 35 U.S.C. 154(b) by 0 days.

(21) Appl. No.: 11/063,517

(22) Filed: Feb. 23, 2005

Related U.S. Application Data

(63) Continuation of application No. 10/967,379, filed on Oct. 18, 2004, now abandoned.

(51) Int. Cl.
*C08G 18/42* (2006.01)

(52) U.S. Cl. ...................... 524/196; 524/539

(58) Field of Classification Search ............ 524/196, 524/157, 210, 362, 539
See application file for complete search history.

(56) References Cited

U.S. PATENT DOCUMENTS

| | | | |
|---|---|---|---|
| 5,695,852 | A | 12/1997 | Richart et al. |
| 5,698,292 | A | 12/1997 | Richart et al. |
| 6,897,259 | B1 * | 5/2005 | Cramer et al. ............. 525/100 |

OTHER PUBLICATIONS

Outgassing: Preventing Coatings Defects from the Inside Out. Thomas P. Frauman. Rohm and Haas Company. 2003.
Dynamic Surface Tension and Surface Engery in Ink Formulations and Substrates. www.pcimag.com. Jun. 2001.
PCI Paint & Coatings Industry 2004 Additives Guide, Paint and Coatings Industry. Apr. 2004.
Surface Coatings Science and Technology: Paul Swaraj. John Wiley & Sons. 1985.
Coatings and Adhesive Raw Materials. Bayer Material Science. www.bayer-is.com. Jan. 2004.
Automotive Coatings. Eastman Chemical Company. www.eastman.com. Jan. 2004.
Products for Powder Coatings Resiflow. Estron Chemical, Inc. www.estron.com. Jan. 2004.
Degassing Agents. Estron Chemical, Inc. www.estron.com. Jan. 2004.
Powderlink 1174 Resin. Cytec Industries, Inc. Jan. 1998.
Wrinkle Finishes. Rohm and Haas Company. www.rohmandhasspowdercoatings.com. 2003.
Troubleshooting Guide/Recoating. Tiger Drylac Canada, Inc. 2001.

* cited by examiner

*Primary Examiner*—Kriellion A Sanders
(74) *Attorney, Agent, or Firm*—Jansson Shupe & Munger Ltd.

(57) ABSTRACT

Compositions for controlling anomalies in the film formed by wrinkle finish powder coating compositions are disclosed as are finished form powder coating compositions, methods and uses. Such compositions, methods and uses are particularly effective in controlling formation of starburst-type anomalies. Wrinkle finish powder coating compositions for use with the invention include epoxy, epoxy-polyester, urethane-polyester and TGIC-free polyester wrinkle resins together with other optional constituents such as wrinkle-forming agents, curatives and catalysts. A starburst control component for controlling formation of starburst-type anomalies in the cured powder coating material comprises a polyester resin binder, a curative, a flow aid and a degassing agent.

26 Claims, 4 Drawing Sheets

1 inch

US 7,585,908 B1

ANOMALY CONTROL COMPOSITIONS FOR WRINKLE FINISH POWDER COATINGS

RELATED APPLICATION

This application is a continuation of U.S. patent application Ser. No. 10/967,379, filed on Oct. 18, 2004, now abandoned the contents of which are incorporated herein by reference.

FIELD

This invention is related generally to powder coating compositions that yield wrinkle finishes with controlled surface anomalies.

BACKGROUND

Wrinkle finish powder coating compositions are dry, free flowing powders applied in fusion coating processes. A fusion coating process is a process in which a coating powder is distributed over a substrate and, when heated, fuses to form a continuous film. The substrate may be heated or unheated when the powder is applied thereto. Heat supplied from the substrate or from an external source, such as an oven, causes the powder to fuse into the continuous film. Known fusion coating processes for application of powder coating compositions to a substrate include electrostatic spraying, fluidized bed coating and hot flocking.

Wrinkle finish coatings fuse to form a film which has a uniformly random series of irregularities which resemble wrinkles. Although having a generally similar "look" or overall appearance, a careful study of a wrinkle finish film reveals what are essentially unique non-repetitive random patterns.

Wrinkle finish powder coating compositions may be made of many different resin materials including epoxy, epoxy-polyester, urethane-polyester, TGIC-free polyester, and acrylic coating materials. TGIC-free refers to resins which are free of triglycidylisocyanurate. Other constituents typically include curatives, flow aids, degassing agents, catalysts, pigments, fillers and charge inhibitors.

Wrinkle finishes are ideal for applications in which hiding of scratches, fingerprints, stains and the like on the coated substrate is desired. Exemplary applications include coating of metal industrial and office equipment, such as toolboxes, file cabinets and computer cabinets. Other examples include lighting fixtures, metal toys and sporting goods.

A potential problem facing applicators of wrinkle finish powder coating materials involves formation in the film of a type of surface anomaly or imperfection known generally in the industry as a "starburst." A starburst or starburst-type anomaly is defined as a surface imperfection which has a somewhat starburst-like appearance. The anomaly typically resembles a series of ripples projecting radially outward from a starburst center. Starburst anomalies may also appear as shiny or glossy spots in the finished film. FIG. 1 is a "Q-panel" with superimposed circles around representative starburst anomalies.

Starburst anomalies may appear randomly along the film formed by the coating. The starburst anomalies disrupt the unique, non-repetitive random patterns of the wrinkle finish and, therefore, affect the random wrinkled appearance of the film. For some applications, starburst-type anomalies are of no consequence and are perfectly acceptable. However, for certain other applications, starburst-type anomalies in the finished film must be controlled. The presence of such anomalies in the finished film may result in rejection of the coated article by the customer. Any such rejection may result in discarding of many thousands of wrinkle finish coated articles or in costly reworking of such articles.

Typical efforts to minimize starbursts have been directed toward improving powder coating material flow characteristics. Such efforts have included increasing extruder temperatures and mix times and increasing flow additives. However, these efforts have not been entirely satisfactory because they may result in undesired side effects such as a condition known as "edge pulling." Edge pulling is a condition in which the coating pulls away from the corners of the coated substrate resulting in incomplete formation of the finished film.

SUMMARY

Wrinkle finish powder coating compositions, starburst control components, methods of manufacture and use are disclosed. Such compositions, methods and uses result in formation of a finished form film in which formation of starburst anomalies is controlled or eliminated. The terms "controlled" or "control" are defined to include both reduction or elimination of starburst anomalies when compared to conventional wrinkle finish compositions.

In general, wrinkle finish powder coating compositions according to the invention comprise about 80 to about 99.9% by weight of a wrinkle finish powder coating component and about 0.1% to about 20% by weight of a component for controlling formation of starburst-type anomalies. Unless otherwise stated, all percentages stated herein are weight percentages. Other constituents may be added to impart desired properties to the finished form powder coating material. The starburst control component may be supplied separately from the wrinkle finish powder coating component and may be added to the wrinkle finish powder coating component by the end user prior to application to an article or substrate to be coated.

The wrinkle finish powder coating component is preferably a conventional thermosetting powder coating resin material. In embodiments, the material is selected from one or more of the group of epoxy, epoxy-polyester, urethane-polyester and TGIC-free polyester wrinkle resins. Conventional additives, such as hardeners, tetramethoxy glycoluril and blocked sulfonic acids (wrinkle finish modifiers), pigments, waxes, catalysts, flow aids, degassing agents and gloss modifiers may be included in the powder coating material component to provide the finished coating appearance desired by the user.

A starburst control component useful in controlling starburst-type anomalies may comprise a polyester resin binder, a curative, a flow aid and a degassing constituent.

DETAILED DESCRIPTION

Figure 1:
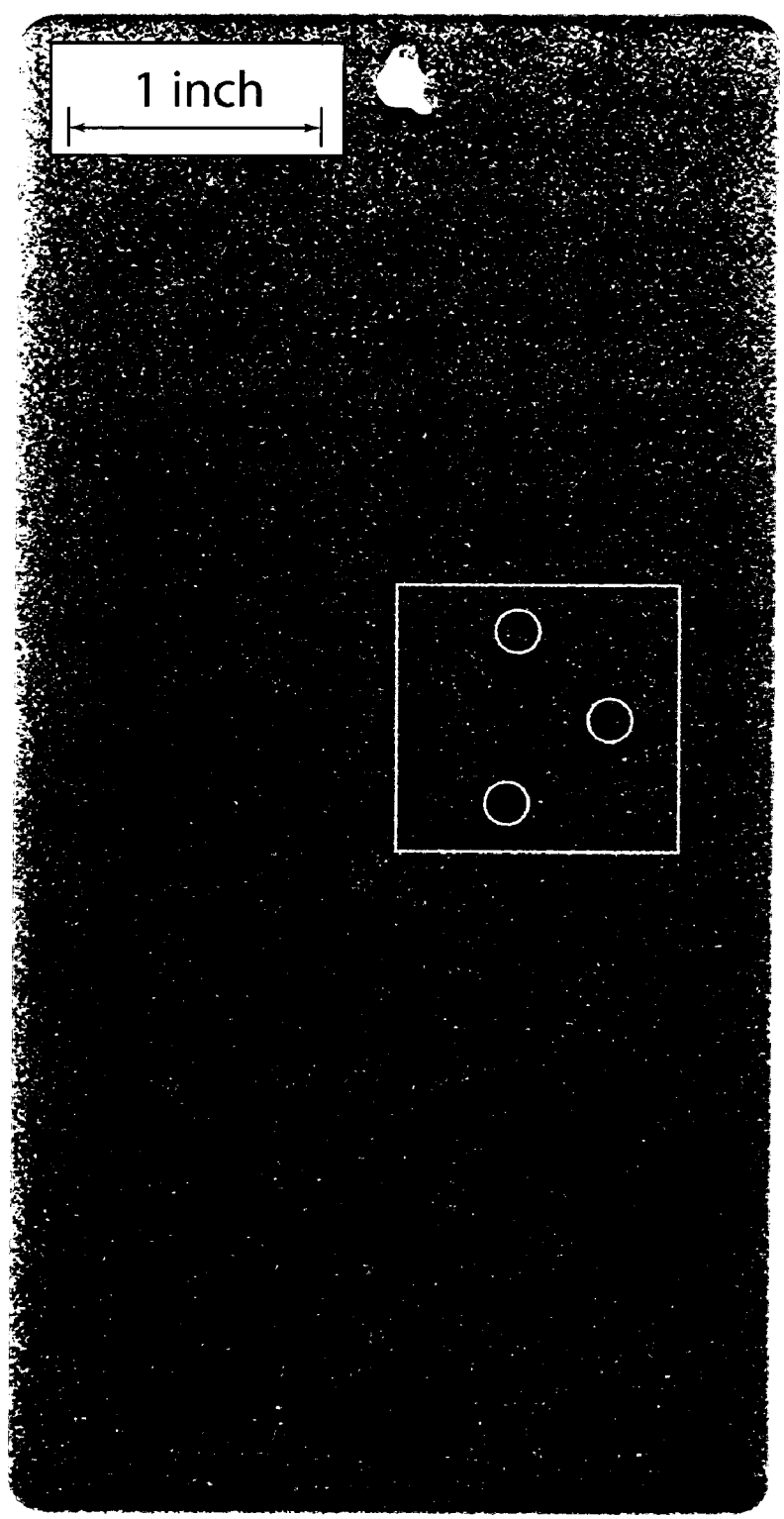
FIG. 1 is a black and white image of a conventional finished form brown-pigmented TGIC-free polyester resin wrinkle finish coating film applied to a standard large size Q-panel substrate. A rectangular box and circles are superimposed over the Q-panel to assist in identification of representative starburst anomalies.

Exemplary wrinkle finish powder coating compositions, starburst control components, methods of manufacture and uses resulting in a coating having controlled surface anomalies will now be described in detail with respect to the drawings, examples and information provided below. The preferred embodiments described herein are not intended to be exhaustive or to limit the invention to the precise form disclosed.

In general, a wrinkle finish powder coating composition formulated for control of starburst anomalies in the film produced by the wrinkle finish powder coating composition may comprise about 80 to about 99.9% by weight of a wrinkle finish powder coating component and about 0.1% to about 20% by weight of a starburst control component. In particularly preferred embodiments, the wrinkle finish powder coating component may comprise about 96 to about 98% by weight of the wrinkle finish coating component and about 2% to about 4% by weight of the starburst control component. Compositions comprising 97% by weight of the wrinkle finish coating component and about 3% by weight of the starburst control component are highly efficacious at controlling formation of starburst anomalies.

It is expected that the starburst control component will be effective at controlling formation of starburst anomalies at weight percentage amounts below 0.1% and exceeding 20% of the finished form wrinkle finish powder coating composition. However, use of such component at weight percentages below 0.1% may result in less effective control of starburst-type anomalies while use at amounts greater than 20% may result in certain properties potentially unacceptable to some end users, such as an increase in gloss, edge pulling or in color inconsistencies.

A wrinkle finish coating component is defined as one or more heat-fusible resins. One or more selected constituents may be included within the wrinkle finish coating composition. Examples of such constituents include hardeners, tetramethoxy glycoluril and blocked sulfonic acids (wrinkle forming additives), pigments, waxes, catalysts, flow aids, degassing agents and gloss modifiers.

Suitable resins for use in the wrinkle finish powder coating component may include hydroxy-functional epoxy, epoxy-polyester, urethane-polyester and TGIC-free polyester resins. The resins are semisolid or solid complexes comprising an amorphous mix of organic compounds. No particular melt point is required and the resins need not have any particular tendency to crystallize.

The wrinkle finish coating component may include a broad range of resins. A representative epoxy resin for use in a standard wrinkle finish coating system is Kukdo Epoxy Resin KD-242G available from Kukdo Chemical Co., Ltd. of Seoul, Korea. KD-242G is a specially designed bisphenol-A type solid epoxy resin for excellent flow. KD-242G resin properties include an epoxy equivalent weight specification of about 650-725 (g/eq), an Hy-Cl specification (hydrolyzable chlorine) of 0.05 max.(wt %), a softening point specification of 85-95° C., a melt viscosity specification of 2000-35000 (cps at 150° C.) and a volatile content specification of 0.30 max. (wt. %).

Suitable hardeners or curing agents for use with KD-242G epoxy resin comprise phenol excess type curing agents. Examples include carboxylic type polyester resins preferably with an acid value of about 75-85. Suitable hardeners are Kukdo KD-401, KD-410 and KD-410J. Other examples include Epicure 101 hardener available from Resolution Company of Houston, Tex. and Dyhard 100 from Degussa of Parsippany, N.J.

Another suitable epoxy resin is Kukdo Epoxy Resin KD-242U. KD-242U is a specially designed bisphenol-A type solid epoxy resin which has excellent flow characteristics. KD-242U has an epoxy equivalent weight specification of 660-720(g/eq), a HY-Cl specification of 0.05 max.(wt %), a softening point specification of 85-95° C., a melt viscosity specification of 1000-4000 (cps at 150° C.) and a volatile content specification of 0.30 maximum (wt. %). Suitable hardeners include Kukdo KD-401, KD-41, KD-410J, Epicure 101 and Dyhard 100.

A general-purpose epoxy resin suitable for use in the wrinkle coating component of the invention is Vantico GT 7013 epoxy resin available from Huntsman Chemical Co. of Salt Lake City, Utah. Vantico GT 7013 has an epoxy equivalent weight specification of 650-725 (g/eq), a softening point specification of 85-92° C. and a melt viscosity specification of 2200-3200 (cps at 150° C.) Kukdo KD-401, KD-410, KD-410J, Epicure 101 and Dyhard 100 are exemplary hardeners suitable for use with the epoxy resin.

Bayer/Dow D.E.R 663U is a solid epoxy resin and is a standard medium molecular weight resin for powder coatings applications. The resin has an epoxy equivalent weight specification of 730-820(g/eq), a softening point specification of 92-102° C. and a melt viscosity specification of 2000-4000 (cps at 150° C.) Kukdo KD-401, KD-410 D-410J, Epicure 101 and Dyhard 100 represent useful hardeners for this epoxy system.

UCB Chemicals Crylcoat 820 from UCB Surface Specialities, Inc. of Smyrna, Ga. is an example of a polyester resin suitable for use as a wrinkle finish component. Crylcoat 820 is a hydroxylated polyester resin designed to produce high quality wrinkle finishes. Crylcoat 820 has a hydroxyl number specification of 32.5+/−3.5 (mg KOH/g), a melt viscosity specification of 12700 (at 200° C.), a glass transition temperature (Tg) specification of >67° C. (DSC) and a curing temperature specification value of 200° C./392° F. Such resin has a viscosity of 127+/−.

A further representative polyester resin suitable for use as a wrinkle finish coating component is UCB Chemicals Crylcoat 120 (UCB Surface Specialities, Inc.). Crylcoat 120 is typically blended with Crylcoat 820. Crylcoat 120 is designed for use in wrinkle finishes and is a catalyst master batch containing 5% active catalyst material. Crylcoat 120 has a hydroxyl number of 42+/−10 (mg KOH/g), and a melt viscosity specification of 8500 (at 200° C.).

Rucote® 118 is a representative polyester urethane resin suitable for use in a wrinkle finish powder coating system. Rucote 118 brand polyester resin binders are available from Bayer Material Science, AG of Columbus, Ga. Rucote 118 is a hydroxyl resin used with isocyanate curatives. Rucote 118 has a glass transition temperature specification of >60° C. (DSC), an acid number specification of 11-15, a hydroxyl (OH) number specification value of 42 and a hydroxyl equivalent weight, nominal, of 1370.

A further polyester resin is SP-400 resin from Sun Polymer International of Mooresville, Ind. SP-400 has a glass transition temperature specification of >62° C. (DSC), a hydroxyl (OH) number specification value of 40-45 and a hydroxyl equivalent weight, nominal, of 1247-1403.

Additional sources of resins suitable for use in a wrinkle finish powder coating system include Hentzen Coatings, Inc. of Milwaukee, Wis., Rohm & Haas of Philadelphia, Pa., Cytec Industries, Inc. of West Paterson, N.J. and Eastman Chemical Company of Kingsport, Tenn.

A wrinkle forming additive is provided in the wrinkle finish powder coating component to produce the desired wrinkle appearance of the cured coating. A preferred wrinkle forming additive comprises a wrinkle modifier component, such as tetramethoxymethyl glycoluril in combination with a blocked sulfonic acid, such as $SO_2OH$. Cytec Industries, Powderlink® 1174 is a preferred form of tetramethoxymethyl glycoluril while blocked sulfonic acids are available from Synthron, Inc. of Morganton, N.C. and UCB Surface Specialties. Tetramethoxymethyl glycoluril resin crosslinks polyester polymers having hydroxyl, carboxyl, amide, carbamate, mercapto or amino functionality when heated in the presence of a strong acid catalyst such as a blocked sulfonic acid to modify the coating surface to include a desired wrinkle finish to the cured powder coating material. The wrinkles comprising the finish may be made more or less pronounced by varying the concentration of blocked sulfonic acid.

As noted, the wrinkle finish powder coating component may include other additives and constituents provided to impart desired properties to the finished form powder coating material. Examples may include curatives, flow aids and pigments. Polymeric isocyanate curatives such as Eastman® Alcure 4402 (Eastman Chemical Company of Kingsport, Tenn.) and modified polyacrylate flow aids such as Resiflow P-67 (Estron Chemical, Inc. of Calvert City, Ky.) are examples. Fillers such as calcium carbonate and barium sulfate may also be included. Leveling agents and surface modifiers may be included. Examples include: silicones, benzoin and fluorinated alkyl esters surfactants. Such products are available from Lubrizol of Wickliffe, Ohio under the trade names, PP1362D Modified PP wax and Lanco 1900 Polymer blend. DT3329 is available from Huntsman Chemical Co. One or more degassing agents, such as benzoin (2-hydroxy-1,2-diphenylethanone) may be included.

By way of example only, a representative wrinkle finish coating component may comprise a combination of a TGIC-free polyester resin, such as UCB 820 carboxyl polyester resin, a Crylcoat 120 masterbatch catalyst resin (5% active catalyst), a Powderlink 1174 curative agent, a Resiflow P-67 flow aid, benzoin degassing agent and one or more pigments. Pigments may include, for example, red oxides, yellow oxides, black oxides, titanium dioxide and calcium carbonate.

A starburst control component is defined as a component which, in combination with a wrinkle finish coating component, controls formation of starburst anomalies in the finished coating. A starburst control component generally comprises four broad components. Such components include a polyester resin component, a curative component, a flow aid component and a degassing component. Other components may be included to impart desired properties to the starburst control component.

The polyester resin binder component is provided to bind the starburst control component constituents together during heating of the powder coating composition following application to the substrate to be coated. In general, polyesters are condensation products resulting from the reaction of carboxylic acids and dihydroxy alcohols. A repeated structural unit in the chain is of the ester type. The resins are semi-solid or solid complexes comprising an amorphous mix of organic compounds. The resin pendent groups are preferably hydroxyl groups.

In embodiments, the polyester resin binder comprises from about 48 to about 97% by weight of the starburst control component. In further embodiments, the polyester resin binder comprises about 81 to about 95% by weight of the starburst control component.

The polyester binder resin systems incorporated into the invention may differ based, for example, on acid values, viscosity, glass transition temperature (Tg) and curing conditions. Preferably, the polyester resin binder comprises hydroxyl-bearing polyesters functional polyester resins w/ hydroxyl (OH) values of 23-47 mg KOH/g and, more preferably 38-44 mg KOH/g, and acid values of 5-15 mg KOH/g and, more preferably, 11-15 mg KOH/g, equivalent weights equal to or greater than 1370-1450 g/mol, a hydroxyl weight of 1300 to 1450, a glass transition temperature (Tg) of about 65-70° C. and a viscosity of about 65-90 centipoise.

Representative polyester resin binders include RUCOTE® 118 brand polyester resin binder (Bayer Material Science), Crylcoat 120, Crylcoat 3109 and UCB 820 polyester resins (UCB Surface Specialities), Dyhard MI catalyst (SKW Chemicals), and SP-400 polyester resin (Sun Polymer).

The curative constituent is thought to accelerate curing and cross-linking of the polymer comprising the powder coating material and can improve the cross-link density. In embodiments, the curative comprises from about 3 to about 43% by weight of the starburst control component. In additional embodiments, the curative component comprises about 4.5 to about 26% by weight of the starburst control component.

Alcure 4402 polymeric isocyanate curative is a suitable curative. Alcure 4402 is an aliphatic polyisocyanate curing agent designed for combination with hydroxyl polyesters. Alcure 4402 has a percent free NCO specification value of 1.0 max (mg HCl/g), a percent NCO specification value of 15.7 (mg HCl/g), a glass transition temperature (Tg) of between about 55° C. to about 65° C. and an NCO equivalent weight of between about 265 to about 290 and an equivalent weight specification value of 280.

Other preferred curatives include Alcure 4470/2470, 4402 XE, 4450/670-4450 curatives also from Eastman Chemical Company. Still other curatives may include methyltolsulfonide, cyclohexylsulfamic acid, cyclamic acid, stannous methane sulfonate, amine blocked sulfonic acids, dimethylethanol amine blocked p-toluene sulfonic acid, dimethylamino methylpropanol blocked p-toluluene sulfonic acid and Fluorad FC-520 catalyst from 3M Corporation of Minneapolis, Minn.

The flow aid constituent, also referred to as a leveling agent, is provided to facilitate dispersion, particularly during extrusion of the constituents comprising the starburst control component. The flow aid is also believed to facilitate flow of the wrinkle finish powder coating following heating so as to aid in obliterating surface irregularities or anomalies. The flow aid comprises from about 0.20 to about 5% by weight of the starburst control component. Other embodiments may include about 0.6 to about 5% by weight of the flow aid.

Preferably, the flow aid is a modified polyacrylate. Polyacrylates are polymers or co-polymers of esters of methacrylic and acrylic acids. A useful flow aid is Resiflow P-67 (Estron Chemical). Other flow aids and leveling agents include Estron Resiflow P-1200 and P-65, Oxymelt A-4 and Oxymelt X-22 flow aids from Monsanto Company and Modaflow 2000 from Cytec Industries.

A degassing agent constituent is provided to avoid off-gassing which can occur during the heating process and result in formed-in bubbles in the coating. Degassing agents allow for release of volatile gases in a molten powder coating film and accelerate the rate of gas bubble shrinkage. In embodiments, the degassing agent may comprise from about 0.21 to about 4% by weight of the starburst control component. In further embodiments, the degassing agent comprises about 0.5 to about 2.4% by weight of the starburst control component. A preferred degassing agent is benzoin. The benzoin may be 2-hydroxy-1,2-diphenylethanone with a molecular weight of 212.2. Sources of benzoin include Estron Chemical of Calvert City, Ky. and GCA Chemical Corporation of Houston, Tex.

It is expected that the starburst control component would be efficacious at constituent weight percentage ranges other than those explicitly described above. Moreover, other constituents, such as catalysts, may be included. Representative catalysts include triethylenediamine available from Air Products and Chemicals, Inc. of Allentown, Pa. and Powderlink 1174, 442 and X320 catalysts from Cytec Industries.

Wrinkle finish coatings according to the invention typically have a range of gloss values. For example, typical gloss values may fall in a range of about 1.7 to about 6.0 using a glossmeter at an angle of 60 degrees.

The wrinkle finish powder coating compositions as described herein may be manufactured by making the starburst control component and then post blending the starburst control component with a wrinkle finish powder coating component. In embodiments, the wrinkle finish powder coating compositions may be sold including the starburst control component and in a ready-to-apply form. In other embodiments, the starburst control component may be sold separately; the end user would then post-blend the starburst control component with the wrinkle finish powder coating component prior to application to the substrate to be coated.

The starburst control component may be prepared by admixing the polyester resin binder, curative, flow aid and degassing components. The components comprising the starburst control component may be admixed sequentially or in a single batch. The components are admixed either with a tumbler for 45 minutes or with a Mixaco for 45 seconds at ambient temperature and pressure, or until such constituents are fully blended.

Next, the blended starburst control component constituents comprising the admixture are extruded to distribute the constituents and form an extrusion product. Any suitable extruder may be used and the extruder may utilize a single or twin screw mechanism. An MP-30 mm twin screw extruder is illustrative. The blended constituents are placed in the extruder hopper and fed via the screw mechanism to the extruder die, preferably with three temperature zones. The zone settings may be, respectively, 60/60/140° F. The blended starburst control constituents are extruded at 300 RPM and at a feed rate of 400 g/min. to form an extrusion product. The flow aid facilitates blending of the constituents during the extrusion process ensuring a uniform distribution of the constituents in the extrusion product. The extrusion product is fed through chill rolls.

The extrusion product is then ground into particles with a suitable grinding machine, such as a Retsch® mill grinder available from Retsch, Inc. of Newton, Pa. The extrusion product is ground for 1-5 minutes at ambient temperature and pressure to form a powder. The powder represents the starburst control component.

The ground extrusion product is preferably screened to yield an appropriate particle size distribution and the finished form starburst control component. Preferably, the ground particles are sifted through a 120 mesh screen to remove any coarse particles. The preferred median particle size weight distribution of the finished-form starburst control component is between about 42μ to about 47μ.

The finished form starburst control component is then post-blended with the wrinkle finish powder coating component to yield a finished form powder coating material according to the invention. Conventional mixing apparatus, such as a high-speed Henschell® mixer (Henschell MixingSystems, Odessa, Fla.), may be used. Preferably, the starburst control component and powder coating material are admixed for about 45 seconds using such high speed mixer.

The wrinkle finish powder coating composition including the starburst control component may then be applied to a substrate by any conventional powder coating process. For example, the wrinkle finish powder coating composition may be applied using a conventional electrostatic spray operation followed by curing for 15 minutes at 375° F. or 10 minutes at about 400° F. in a standard conventional oven to produce a finished coating having a thickness of about 2-3 mils. It is intended that articles coated with a wrinkle finish powder coating composition as described herein are within the scope of the invention.

Figure 2:
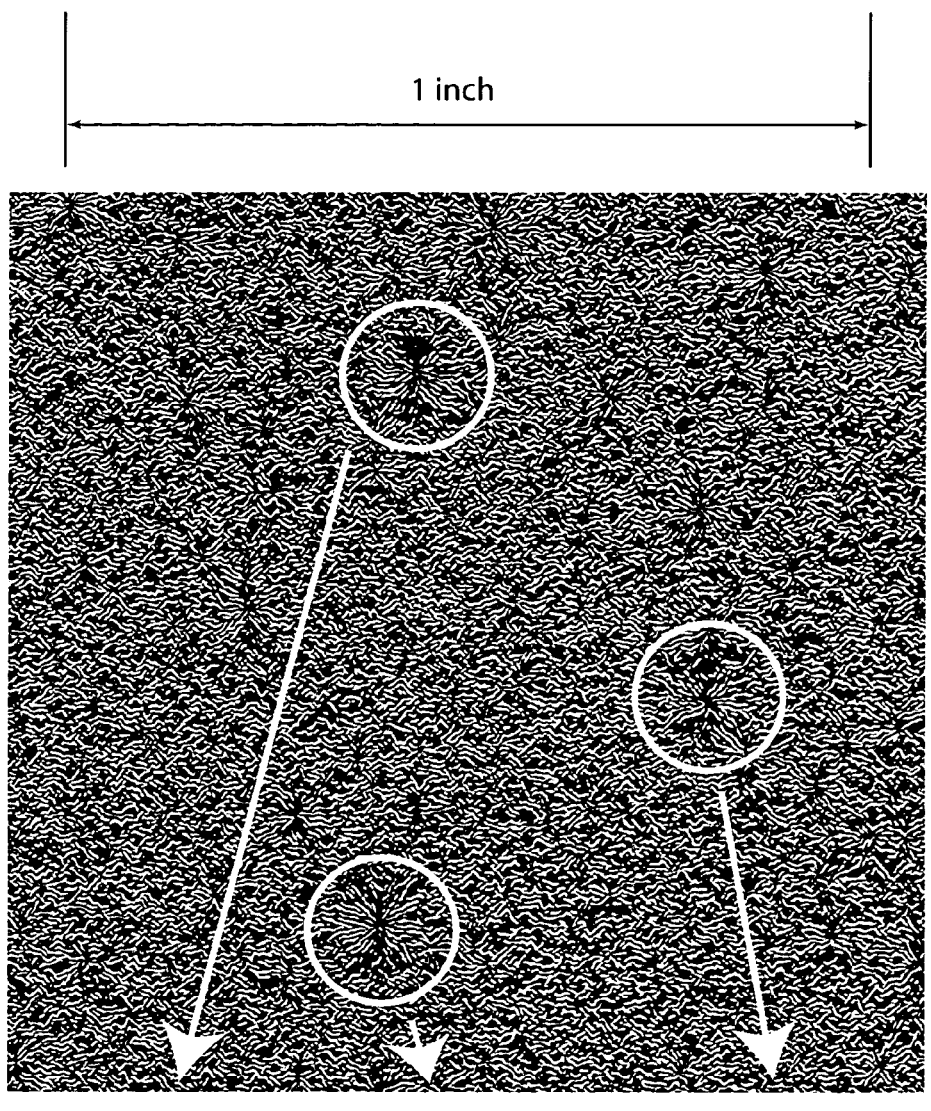
FIG. 2 is an enlarged view of the boxed portion of the FIG. 1 Q-panel. Reference lines are superimposed to direct the reader's attention to the appropriate one of FIGS. 2A, 2B and 2C.
Figure 2A:
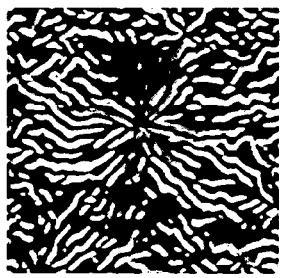
FIGS. 2A, 2B and 2C are further enlarged views of circled starburst anomalies of FIGS. 1 and 2.
Figure 2B:
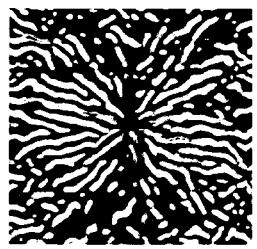
Figure 2C:
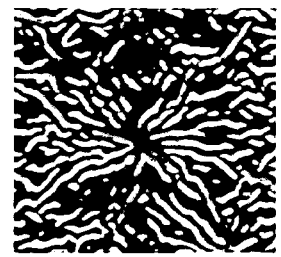

Powder coating compositions as described herein result in a wrinkle finish coating with controlled formation of starburst anomalies. FIGS. 1 through 4 illustrate control of representative starburst anomalies. FIGS. 1 and 2 may be considered "before" images showing representative starburst anomalies formed in the film of a brown-pigmented TGIC-free polyester wrinkle finish powder coating of Example 1. Radially-outward-projecting ripples of representative starburst anomalies are observable, particularly in the enlarged images of FIGS. 2A, 2B and 2C. As noted elsewhere, starburst-type anomalies are not limited to the appearance of those shown in FIGS. 1 and 2 and may appear in other forms such as shiny or glossy spots in the finished film.

Figure 3:
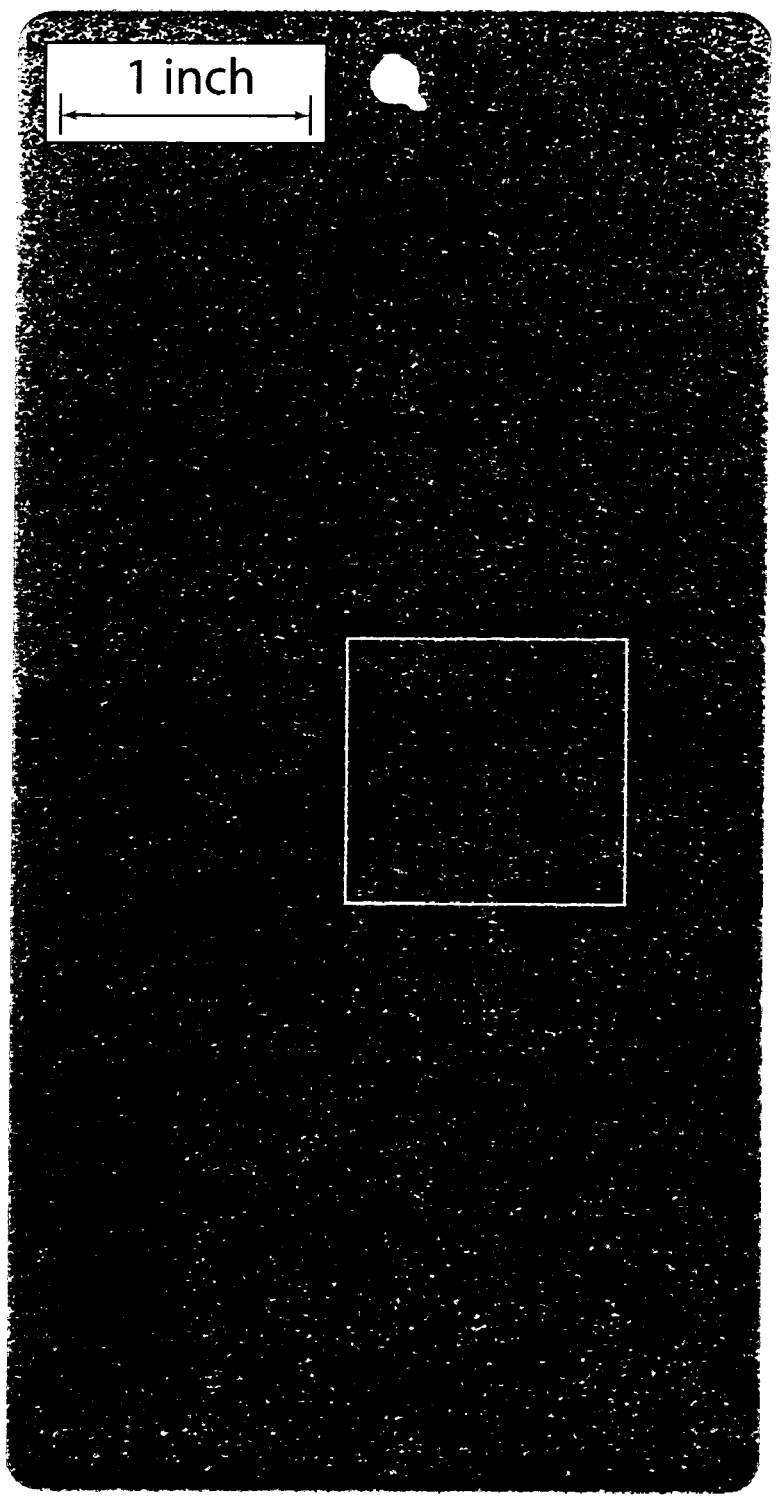
FIG. 3 is a black and white image of a film formed by the brown-pigmented TGIC-free polyester resin wrinkle finish coating of FIG. 1, but including an exemplary starburst control component. The coating of FIG. 3 is applied to a Q-panel. A rectangular box is superimposed over a portion of the Q-panel of FIG. 3 which corresponds to the same portion of the Q-panel of FIGS. 1 and 2.
Figure 4:
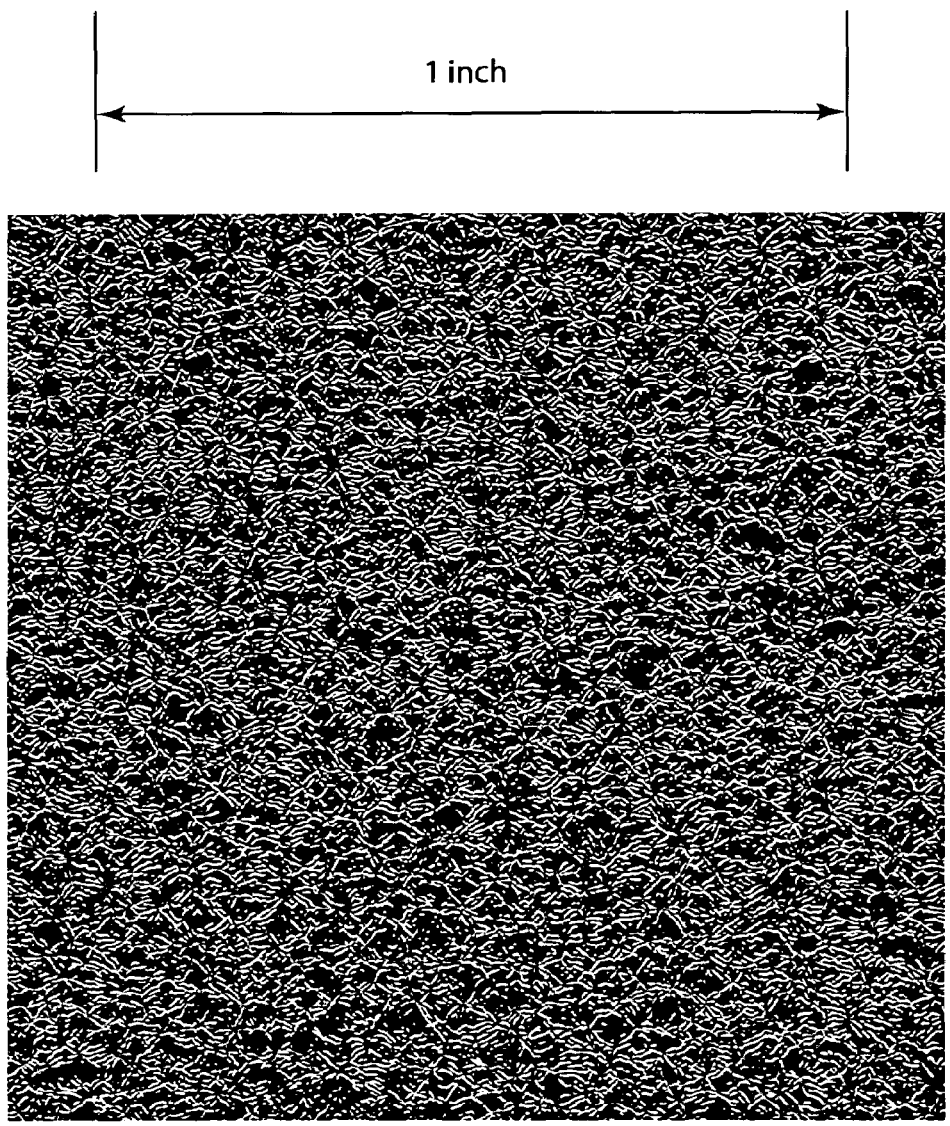
FIG. 4 is an enlarged view of the boxed portion of the FIG. 3 Q-panel.

FIGS. 3 and 4 may be considered "after" images of the same coating including a starburst control component as described in Example 9 herein. It is apparent from FIGS. 3 and 4 that the starburst anomalies have been controlled because such anomalies are essentially eliminated from the film shown in FIGS. 3 and 4.

Without wishing to be bound by any particular theory, it is believed that starburst control components according to the invention reduce the surface tension of the molten powder coating material permitting such material to flow in a more uniform manner thereby avoiding formation of starburst-type anomalies. It is thought that the reduced surface tension and improved material flow result from formation of an emulsion or colloidal suspension during heating of the powder coating material when starburst control components are catalyzed with one or more amine blocked sulfonic acids ($SO_2OH$) in a resin binder system.

As demonstrated in the examples which follow, the starburst control component achieves control of starburst anomalies yet avoids (as compared to an unmodified wrinkle finish coating composition) undesired color inconsistencies, edge pulling and loss of desired low levels of gloss.

EXAMPLES

Examples 1-16

Base Formulations

Exemplary wrinkle finish powder coating compositions were prepared. Each coating composition included a conventional TGIC-free polyester wrinkle finish powder coating component. The TGIC-free polyester wrinkle finish coating component selected was a medium brown pigmented coating product commercially available from Hentzen Coatings, Inc. of Milwaukee, Wis. under product code P10022DPK A batch of the P10022DPK powder coating component includes polyester resin, catalyst, wrinkle forming additive, pigments and other additives. Examples 2-16 include a starburst control component (identified as "SCC" in the tables) admixed with the wrinkle finish powder coating component. The starburst control component selected for each example included the constituents listed in Table 1 for a 570.29 gram batch.

TABLE 1

Starburst Control Component

| No. | Constituent | Description | Amount (grams) | Weight % |
|---|---|---|---|---|
| 1 | Rucote 118 | polyester powder binder | 462 g | 81.0% |
| 2 | Alcure 4402 | polymeric isocyanate curative | 90.09 g | 15.8% |
| 3 | Resiflow P-67 | flow aid | 10.16 g | 1.78% |
| 4 | Benzoin | de-gassing agent | 8.04 g | 1.41% |
| | Total | | 570.29 g | 100% |

For each of Examples 2-16, 30 grams of the wrinkle finish powder coating component were admixed (also referred to as postblended) with the indicated weight percentage of the starburst control component. Each composition of Examples 1-16 was in the form of a dry, free flowing powder suitable for application to a substrate using conventional electrostatic powder coating apparatus.

Each powder coating composition was applied to either a large or small size Q-panel substrate using an electrostatic spraying process. The large size Q-panels are 8.325"×4.1875" (34.86 inch$^2$ area) and the small size Q-panels are 3.125"×6.250" (19.53 inch$^2$ area). Large size Q-panels were used in Examples 1 and 9 while small size Q-panels were used in Examples 2-8 and 10-16.

After admixing, each wrinkle finish powder coating composition was electrostatically charged and applied to a large or small size standard steel Q-panel with a spray gun in a spray booth. Each coated Q-panel was removed from the spray booth and heated in a convection oven until the coating was melted and cured. Heating time ranged from 10 to 15 minutes at a temperature range of from about 375 to about 400° F. The finished-form coating on each Q-panel substrate had a thickness of generally between about 2 to about 4 mils after cooling as noted in the following examples.

Observations with respect to control of starburst anomalies, gloss, color change and edge pull were made as noted in each example. Control of starburst anomaly formation was evaluated in terms of visually observed starbursts on each Q-panel. Gloss measurements were taken as noted of certain of the finished form coatings. The gloss measurements were taken using a Byk Instruments glossmeter (Byk-Gardner, Norwalk, Conn.) at an angle of 60 degrees to the coating surface.

Color measurements were taken as noted of certain of the finished form coatings. The measurements were taken using an X-Rite, Inc. Model 8000 spectrophotometer colorimeter set to quantify color element values for lightness (L*), red/green value (a*) and yellow/blue value (b*) according to the CIELAB method. In certain of the examples, the colorimeter was used to measure color differences between the coatings on selected Q-panels. The color difference between panels is quantified in delta value units ($\Delta$). A delta value of less than 1 is accepted as indicating essentially no human-observable difference between the colors being compared.

Example 1

Example 1 is a comparative example comprising a wrinkle finish powder coating component consisting of 100% by weight of the wrinkle finish coating component; no starburst control component was included. Approximately 30 grams of the P10022DPK powder coating material were applied to one Q-panel and the coated Q-panel was baked at 375° F. for 15 minutes.

FIGS. 1, 2, 2A, 2B and 2C are images of the wrinkle finish powder coating composition of Example 1 following application to the Q-panel and cooling. The coating film shown in FIGS. 1, 2 and 2A through 2C includes numerous starburst anomalies. As noted in Table 2, thirty seven starburst-type anomalies were observed to be present on the surface of the large size Q-panel of FIG. 1. Gloss, thickness and color data are presented in Table 2. No edge pulling was observed.

TABLE 2

| Q-Panel | Coating/SCC (Grams) | Coating SCC (Wt. %) | Starbursts | Gloss | $\Delta$ (vs. Ex. 1) | Thickness (Mils) | Color (L*a*b*) L* | a* | b* |
|---|---|---|---|---|---|---|---|---|---|
| 1 | 30/0 | 100/0 | 37 | 3.0 | ** | 2.5 | 30.01 | 2.19 | 4.13 |

Some end users of the wrinkle finish coating of Example 1 may consider the appearance of the coating to be unacceptable because of the numerous starburst anomalies in the coating surface. (Others may find the appearance completely acceptable, depending on the intended use of the coated article.) Such starburst anomalies may potentially result in rejection of the coated part by the end user.

Example 2

A wrinkle finish powder coating composition was prepared comprising 99% by weight of the wrinkle finish coating component and 1% by weight of the starburst control component. The coating composition consisted of 30 grams of P10022DPK wrinkle finish coating component admixed with 0.3 grams of the starburst control component of Table 1. The composition was a dry, free flowing powder. Three batches were prepared and applied to separate small size Q-panels. The Q-panels including the coating composition were heated in an oven at 375° F. for 15 minutes. Table 3 presents the data.

TABLE 3

| Q-Panel | Coating/SCC (Grams) | Coating/SCC (Wt. %) | Starbursts | Gloss | $\Delta$ (vs. Ex. 1) | Thickness (Mils) | Color (L*a*b*) L* | a* | b* |
|---|---|---|---|---|---|---|---|---|---|
| 1 | 30/0.3 | 99/1 | 0 | 2.8-3.2 | 0.02 | 1.9-2.2 | 30.01 | 2.21 | 0.02 |
| 2 | 30/0.3 | 99/1 | 0 | 2.1-2.5 | ** | 2.3-3.0 | ** | ** | ** |
| 3 | 30/0.3 | 99/1 | 0 | 2.0-2.4 | ** | 2.7-3.0 | ** | ** | ** |

No starbursts were observed on any of the three Q-panels. The gloss levels are within gloss ranges satisfactory for use in wrinkle finish coating compositions. Color was observed to be generally consistent for each of the three Q-panels of Example 2.

The coatings of Example 1 and Example 2, panel 1 had a colorimeter-measured color difference delta value of 0.02 indicating that there is no observable color difference between the coatings. The composition of Example 2 represents an improvement over the composition of Example 1 for those end users interested in controlling formation of starburst-type anomalies.

Example 3-7

Five wrinkle finish powder coating compositions were prepared comprising from 99.9 to 99.1% by weight of P10022DPK wrinkle finish coating component with the balance comprising a starburst control component (Table 1). Each composition was applied to a small size Q-panel and was heated for 15 minutes at 375° F. Data are provided in Table 4.

TABLE 4

| Ex. | Coating/ SCC (Grams) | Coating/ SCC (Wt. %) | Starbursts | Gloss | Δ (vs. Ex. 1) | Thickness (Mils) | Color (L*a*b*) | | |
|---|---|---|---|---|---|---|---|---|---|
| | | | | | | | L* | a* | b* |
| 3 | 30/0.03 | 99.9/0.1 | 6 | 2.1 | 1.45 | 3.6-4.4 | −0.91 | −0.19 | −0.52 |
| 4 | 30/0.09 | 99.7/0.3 | 9 | 2.5 | 1.30 | 2.9-4.4 | −.033 | −0.26 | −0.82 |
| 5 | 30/0.12 | 99.6/0.4 | 9 | 2.2 | 1.43 | 4.0-4.9 | −0.54 | −0.24 | −0.71 |
| 6 | 30/0.24 | 99.2/0.8 | 0 | 2.5 | 1.27 | 3.8-4.6 | −0.38 | −0.26 | −0.76 |
| 7 | 30/0.27 | 99.1/0.9 | 0 | 2.4 | 1.43 | 4.0-4.1 | −0.47 | −0.25 | −0.76 |

Formation of starburst anomalies was controlled in each of Examples 3-7 (i.e., at starburst control component amounts of between about 0.1 to 0.9 percent by weight). Gloss and color were generally consistent in Examples 3-7. The delta value comparison based on Example 1, and Examples 3-7 indicate that an observer would have difficulty detecting any qualitative color difference between such coatings.

Example 8

Three exemplary compositions comprising 98% by weight of the wrinkle finish coating component and 2% by weight of the starburst control component were prepared each by admixing 30 grams of the P10022DPK wrinkle finish coating component with 0.6 grams of the component of Table 1. Each batch was electrostatically spray applied to a separate small size Q-panel and the coated panels were heated at 385° F. for 15 minutes. The data are presented in Table 5.

Starburst-type anomalies were controlled in each coating composition of Example 8. Gloss was generally consistent between the batches and such gloss levels are well within the gloss ranges satisfactory for use in wrinkle finish coating compositions. Color was observed to be consistent in the three Q-panels of Table 4 and no edge pulling was observed. The colorimeter-measured delta value difference between the color of Example 1 and Example 8, panel 1 is 0.40 indicating essentially no observable color difference between the coatings.

Example 9

Two batches of a wrinkle finish powder coating composition were prepared comprising 97% by weight of the wrinkle finish coating component and 3% by weight of the starburst control component. For each batch, 30 grams of P10022DPK wrinkle finish coating component were admixed with 0.9 grams of the component of Table 1. Each composition was applied to a large size Q-panel and the coated panels were heated at 375° F. for 15 minutes. Table 6 presents the data.

TABLE 5

| Q-Panel | Coating/ SCC (Grams) | Coating/ SCC (Wt. %) | Starbursts | Gloss | Δ (vs. Ex. 1) | Thickness (Mils) | Color (L*a*b*) | | |
|---|---|---|---|---|---|---|---|---|---|
| | | | | | | | L* | a* | b* |
| 1 | 30/0.6 | 98/2 | 0 | 2.8-3.2 | 0.40 | 3.1-3.5 | 30.35 | 2.14 | 3.93 |
| 2 | 30/0.6 | 98/2 | 0 | 2.1-2.5 | ** | 3.1-3.5 | ** | ** | ** |
| 3 | 30/0.6 | 98/2 | 0 | 2.3-2.5 | ** | 3.1-3.5 | ** | ** | ** |

TABLE 6

| Q-Panel | Coating/SCC (Grams) | Coating/SCC (Wt. %) | Starbursts | Gloss | Δ (vs. Ex. 1) | Thickness (Mils) | Color (L*a*b*) L* | a* | b* |
|---|---|---|---|---|---|---|---|---|---|
| 1 | 30/0.9 | 97/3 | 0 | 2.3-2.7 | 0.12 | 2.7-3.3 | 30.11 | 2.2 | 4.06 |
| 2 | 30/0.9 | 97/3 | 0 | 2.3-3.6 | ** | 2.5-3.7 | ** | ** | ** |

Starburst-type anomalies were controlled in the compositions of Example 9. FIG. 3 is an image of a coated large size Q-panel of Example 9, panel 1 and FIG. 4 is an enlarged portion of such Q-panel. No starburst anomalies are observable. Gloss was consistently low in the coating of each Q-panel. Coating color was observed to be consistent on each of the two Q-panels of Example 9 and no edge pulling was observed. The delta value of 0.12 indicates that there is no apparent color difference between the compositions of Example 1 and Example 9, panel 1. The coating composition of Example 9 looked satisfactory, was consistent in appearance and had an excellent finish.

Example 10

Thirty grams of the P10022DPK wrinkle finish coating component were admixed with 1.2 grams of the component of Table 1 to yield a 96/4% by weight wrinkle finish powder coating component. The composition was electrostatically applied to a small size Q-panel and the panel was heated at 375° F. for 15 minutes.

TABLE 7

| Q-Panel | Coating/SCC (Grams) | Coating/SCC (Wt. %) | Starbursts | Gloss | Δ (vs. Ex. 1) | Thickness (Mils) | Color (L*a*b*) L* | a* | b* |
|---|---|---|---|---|---|---|---|---|---|
| 1 | 30/1.2 | 96/4 | 0 | 2.1-23 | 0.20 | 2.0-3.0 | 30.20 | 2.15 | 4.09 |

No starburst anomalies were observed. Gloss was low. The delta value between the composition of Example 10 compared to that of Example 1 is 0.20 again indicating no meaningful color difference. No edge pulling was observed. The coating composition of Example 10 looked satisfactory, was consistent in appearance and had an excellent finish.

Example 11

A wrinkle finish powder coating composition comprising 95% by weight of wrinkle finish coating component and 5% by weight of starburst control component was prepared by admixing 30 grams of the P10022DPK wrinkle finish coating component with 1.5 grams of the starburst control component of Table 1. Three separate batches were prepared and applied to separate small size Q-panels. The Q-panels were heated at 375° F. for 15 minutes. Table 8 presents data for Example 11.

TABLE 8

| Q-Panel | Coating/SCC (Grams) | Coating/SCC (Wt. %) | Starbursts | Gloss | Δ (vs. Ex. 1) | Thickness (Mils) | Color (L*a*b*) L* | a* | b* |
|---|---|---|---|---|---|---|---|---|---|
| 1 | 30/1.5 | 95/5 | 0 | 2.5-2.8 | 0.51 | 2.9-3.2 | 30.46 | 2.12 | 3.90 |
| 2 | 30/1.5 | 95/5 | 0 | 2.6-2.7 | ** | 2.8-3.3 | ** | ** | ** |
| 3 | 30/1.5 | 95/5 | 0 | 2.3-2.6 | ** | 2.5-3.8 | ** | ** | ** |

No starburst-type anomalies were observed on any of the three Q-panels. Gloss was low in each batch but is slightly elevated when compared to the preceding examples. Coating color was observed to be consistent among the three Q-panels and no edge pulling was observed. The 0.51 delta value observed between Example 1 and Example 11, panel 1 indicates that the starburst control component does not adversely affect color consistency. The coating composition of Example 11 had a good finished appearance and is a satisfactory wrinkle finish powder coating material.

Example 12

The wrinkle finish powder coating composition of Example 12 was prepared by admixing 94% by weight of the wrinkle finish coating component with 6% by weight of the starburst control component of Table 1. In each of two batches, 30 grams of P10022DPK wrinkle finish coating component were admixed with 1.8 grams of the starburst control component. The coating compositions were applied to separate small size Q-panels and were heated at 375° F. for 15 minutes. Table 9 presents the data.

TABLE 9

| Q-Panel | Coating/SCC (Grams) | Coating/SCC (Wt. %) | Starbursts | Gloss | Δ (vs. Ex. 1) | Thickness (Mils) | Color (L*a*b*) L* | a* | b* |
|---|---|---|---|---|---|---|---|---|---|
| 1 | 30/1.8 | 94/6 | 0 | 2.4-2.7 | 0.23 | 3.0-3.4 | 30.24 | 2.16 | 4.10 |
| 2 | 30/1.8 | 94/6 | 0 | 2.4-2.6 | ** | 3.0-4.3 | ** | ** | ** |

Starburst anomalies were completely controlled. Gloss remained within acceptable ranges. The delta value of 0.23 indicates color consistency. The wrinkle finish was observed to look good with a consistent appearance.

Example 13

In Example 13, wrinkle finish powder coating compositions were prepared by admixing 90% by weight of the wrinkle finish coating component with 10% by weight of the starburst control component. Thirty grams of P10022DPK wrinkle finish coating component were admixed with 3.3 grams of the starburst control component of Table 1. Three identical batches were prepared and were electrostatically spray-applied to separate small size Q-panels. The coated Q-panels were heated at 375° F. for 15 minutes. Data are provided in Table 10.

TABLE 10

| Q-Panel | Coating/SCC (Grams) | Coating/SCC (Wt. %) | Starbursts | Gloss | Δ (vs. Ex. 1) | Thickness (Mils) | Color (L*a*b*) L* | a* | b* |
|---|---|---|---|---|---|---|---|---|---|
| 1 | 30/3.3 | 90/10 | 0 | 2.3-4.4 | 2.10 | 2.7-3.1 | 32.11 | 2.26 | 4.15 |
| 2 | 30/3.3 | 90/10 | 0 | 3.1-3.6 | ** | 2.5-3.6 | ** | ** | ** |
| 3 | 30/3.3 | 90/10 | 0 | 3.3-4.4 | ** | 2.7-3.8 | ** | ** | ** |

No starburst-type anomalies were observed on any of the 3 Q-panels. Gloss was noted to increase at lower coating builds but is acceptable for a wrinkle finish coating composition. Color was again consistent among the 3 panels with the coating of Example 13 appearing slightly lighter than that of Example 1. The delta value difference between the composition of Example 13, panel 1 and Example 1 was only 2.10 indicating little qualitative color difference. No edge pulling was observed.

Example 14

Three batches of wrinkle finish powder coating compositions were prepared by admixing 85% by weight of the wrinkle finish coating component with 15% by weight of the starburst control component. Specifically, 30 grams of the P10022DPK wrinkle finish coating component were admixed with 5.3 grams of the component of Table 1. Each of the three batches were electrostatically spray-applied to separate small size Q-panels. The coated panels were heated at 375° F. for 15 minutes. Table 11 presents data for Example 14.

TABLE 11

| Q-Panel | Coating/SCC (Grams) | Coating/SCC (Wt. %) | Starbursts | Gloss | Δ (vs. Ex. 1) | Thickness (Mils) | Color (L*a*b*) L* | a* | b* |
|---|---|---|---|---|---|---|---|---|---|
| 1 | 30/5.3 | 85/15 | 0 | 6.8-10.9 | 1.48 | 2.3-2.8 | 31.49 | 2.26 | 4.23 |
| 2 | 30/5.3 | 85/15 | 0 | 6.7-9.3 | ** | 2.7-3.0 | ** | ** | ** |
| 3 | 30/5.3 | 85/15 | 0 | 4.8-6.8 | ** | 3.4-4.5 | ** | ** | ** |

No starburst-type anomalies were observed on any of the 3 Q-panels. The wrinkle appearance of the coating is consistent. Gloss is greater than previous examples but remains in an acceptable range for a wrinkle finish coating composition. Color was again consistent for each of the three panels. The coating of Example 14 appeared only slightly lighter than that of Example 1. The delta value difference between the compositions of Example 14, panel 1 and Example 1 was 1.48 indicating little qualitative color difference. No edge pulling was observed.

Example 15

Three batches of wrinkle finish powder coating compositions were prepared by admixing 30 grams of P10022DPK wrinkle finish coating component with 6.6 grams of the starburst control component of Table 1. Each of the three batches were spray-applied to separate small size Q-panels and the coated panels were heated at 375° F. for 15 minutes. Table 12 presents the data.

TABLE 12

| Q-Panel | Coating SCC (Grams) | Coating/ SCC (Wt. %) | Starbursts | Gloss | Δ (vs. Ex. 1) | Thickness (Mils) | Color (L*a*b*) | | |
|---|---|---|---|---|---|---|---|---|---|
| | | | | | | | L* | a* | b* |
| 1 | 30/6.6 | 82/18 | 0 | 13.4-13.8 | ** | 2.3-3.0 | 31.71 | 2.26 | 4.42 |
| 2 | 30/6.6 | 82/18 | 0 | 9.8-11.4 | ** | 2.8-3.4 | ** | ** | ** |
| 3 | 30/6.6 | 82/18 | 0 | 5.4-5.5 | ** | 2.7-3.5 | ** | ** | ** |

No starburst-type anomalies were observed on any of the 3 Q-panels. Gloss increases at lower build levels but is acceptable for certain applications. Slight edge pull is noticed around the panel edges. Color was consistent.

Example 16

Wrinkle finish powder coating compositions were prepared by admixing 80% by weight of the wrinkle finish coating component with 20% by weight of the starburst control component. Three batches of compositions according to Example 16 were prepared by admixing 30 grams of the P10022DPK wrinkle finish coating component with 7.5 grams of the starburst control component of Table 1. Each of the three batches were spray-applied to small size separate Q-panels and the panels were heated at 375° F. for 15 minutes.

No starburst-type anomalies were observed on any of the three Q-panels indicating efficacy at this elevated weight percentage of starburst control component when compared to the composition of Example 1. Absence of observable starburst-type anomalies indicates that weight percentages of the starburst control component in excess of 20% by weight would be effective in controlling formation of the starburst-type anomalies. The wrinkle appearance is very slight. Gloss was observed to increase at the lower build levels but is likely acceptable for certain applications. Slight edge pull was noticed around the panel edges. Color was consistent between the three panels and color appeared only slightly lighter than that of Example 1. The delta value difference between the composition of Example 16 (panel 2) and Example 1 was 2.13 indicating little qualitative color difference.

Examples 17-22

Base Formulations

The base formulations for Examples 17-22 included a wrinkle finish powder coating component comprising Hentzen Coatings P10022DPK TGIC-free polyester wrinkle finish powder coating with a medium brown pigment. A starburst control component was also included. Table 14 lists the constituents for a 570.29 gram batch of the starburst control component of Examples 17-22.

TABLE 13

| Q-Panel | Coating/ SCC (Grams) | Coating/ SCC (Wt. %) | Starbursts | Gloss | Δ (vs. Ex. 1) | Thickness (Mils) | Color (L*a*b*) | | |
|---|---|---|---|---|---|---|---|---|---|
| | | | | | | | L* | a* | b* |
| 1 | 30/7.5 | 80/20 | 0 | 11.3-12.1 | ** | 2.0-2.3 | ** | ** | ** |
| 2 | 30/7.5 | 80/20 | 0 | 8.6-11.0 | 2.13 | 2.1-2.5 | 32.13 | 2.26 | 4.32 |
| 3 | 30/7.5 | 80/20 | 0 | 8.1-10.2 | ** | 3.0-3.6 | ** | ** | ** |

TABLE 14

Examples 17-22
Starburst Control Components

| Constituent | Ex. 17 | | Ex. 18 | | Ex. 19 | | Ex. 20 | | Ex. 21 | | Ex. 22 | |
|---|---|---|---|---|---|---|---|---|---|---|---|---|
| | Grams | Wt. % | Grams | Wt. % | Grams | Wt. % | Grams | Wt. % | Grams | Wt. % | Grams | Wt. % |
| Rucote 118 | 462 | 81.3 | 462 | 90 | 462 | 94.6 | 231 | 68.5 | 308 | 85.3 | 385 | 93.7 |
| Alcure 4402 | 88 | 15.5 | 44 | 8.5 | 22 | 4.5 | 88 | 26.1 | 44 | 12.2 | 22 | 5.3 |
| Resiflow P-67 | 10 | 1.76 | 5 | 0.97 | 2.5 | .51 | 10 | 2.97 | 5 | 1.4 | 2.5 | 0.6 |
| Benzoin | 8 | 1.41 | 4 | 0.78 | 2 | 0.40 | 8 | 2.4 | 4 | 1.1 | 2 | 0.49 |
| Totals | 568 | 100 | 515 | 100 | 488.5 | 100 | 337 | 100 | 361 | 100 | 411.5 | 100 |

Each base formulation of Examples 17-22 included 97% by weight of the wrinkle finish powder coating component and 3% by weight of the starburst control component. The weight percentages of the starburst control component constituents were varied in each of Examples 17-22 as shown in Table 14. It is expected that the starburst control component would be efficacious incorporating constituent weight percentage ranges other than those explicitly described in connection with Examples 17-22 and Table 14.

Each wrinkle finish powder coating composition of Examples 17-22 was prepared in the same manner as Examples 2-16. Each exemplary formulation consisted of 30 grams of the P10022DPK wrinkle finish powder coating component of Examples 1-16 post-blended with 0.9 grams of the selected starburst control component of Table 14. Each composition of Examples 17-23 was in the form of a dry flowable powder suitable for application to a substrate using conventional electrostatic powder coating apparatus.

After post blending, each exemplary wrinkle finish powder coating composition was electrostatically charged and applied to a standard small size Q-panel (i.e., 3.125"×6.250") with a spray gun in a spray booth. Each coated panel was removed from the spray booth and heated in a convection oven until the coating was melted and cured. Heating time in the oven was about 15 minutes at 375° F. The finished-form coating had a thickness of between approximately 2-3 mils after cooling.

Observations were made as indicated of starburst control, gloss, color change and edge pull as noted in each example. Starburst control was evaluated in terms of number of starbursts observed on the 19.53 square inch surface area of each Q-panel. Gloss measurements were taken of certain of the Q-panels using a Byk Instruments glossmeter (Byk Instruments, Norwalk, Conn.) at an angle of 60 degrees to the coated surface. Color measurements were taken using the X-Rite, Inc. Model 8000 spectrophotometer colorimeter again using the CIELAB method.

Table 15 presents data on selected physical properties of the coating compositions of Examples 17-22.

TABLE 15

| Example | Starbursts (19.53 inch$^2$ Q-Panel) | Gloss | Color (L*a*b*) | | | Color Difference Δ (vs. Ex. 17) |
|---|---|---|---|---|---|---|
| | | | L* | a* | b* | |
| 17 | 0 | 1.1 | 31.66 | 2.39 | 4.28 | 0 |
| 18 | 0 | 1.3 | 31.66 | 2.39 | 4.32 | 0.04 |
| 19 | 0 | 2.1 | 31.43 | 2.41 | 4.40 | 0.27 |
| 20 | 0 | 1.4 | 31.67 | 2.37 | 4.24 | 0.04 |
| 21 | 0 | 1.3 | 31.65 | 2.41 | 4.36 | 0.09 |
| 22 | 0 | 1.6 | 31.51 | 2.39 | 4.35 | 0.17 |

Examples 17-22

Data and Observations

Starburst-type anomalies were completely controlled in each of the 97%/3% wrinkle finish powder coating compositions of Examples 17-22. Color was observed to be consistent in each of the six Q-panels. Color consistency is confirmed by the colorimeter data which indicates similar color values. As indicated in Table 15, the delta unit difference between Example 17 and each of the coatings of Examples 18-22 was less than one indicating color consistency. No edge pulling was observed. Each of Examples 17-22 represents an excellent wrinkle finish powder coating composition with controlled surface anomalies.

Examples 23-52

Base Formulations

Examples 23-52 are directed to further wrinkle finish compositions and demonstrate efficacy of additional starburst control component variants across a range of weight percentages. The base formulations for Examples 23-52 included a wrinkle finish powder coating component comprising a medium brown pigmented Hentzen Coatings P10022DPK TGIC-free polyester wrinkle finish powder coating and a starburst control component. Table 16 lists the constituents for the starburst control component of Examples 23-52.

TABLE 16

Examples 23-52
Starburst Control Components

| | Example Numbers | | | | | |
|---|---|---|---|---|---|---|
| | Examples 23-32 | | Examples 33-42 | | Examples 43-52 | |
| Constituent | Grams | Wt. % | Grams | Wt % | Grams | Wt. % |
| Rucote 118 | 366 | 53.5 | 300 | 48.5 | 1386 | 96.45 |
| Alcure 4402 | 264 | 38.6 | 264 | 42.7 | 45 | 3.13 |
| Resiflow P-67 | 30 | 4.4 | 30 | 4.9 | 3 | 0.21 |
| Benzoin | 24 | 3.5 | 24 | 3.9 | 3 | 0.21 |
| Totals | 1050 | 100 | 618 | 100 | 1437 | 100 |

Each base formulation of Examples 23-52 included from 99-90% by weight of the wrinkle finish powder coating component and from 1-10% by weight of the starburst control component. It is expected that the starburst control component is efficacious at weight percentage ranges other than those explicitly described in connection with Examples 23-52 and Table 16.

Each wrinkle finish powder coating composition of Examples 23-52 was prepared in the same manner as Examples 2-11. Each exemplary formulation consisted of 30 grams of a Hentzen Coatings P10022DPK wrinkle finish powder coating component post-blended with between from 1 to 10 percent by weight of (i.e., 0.3-3 grams) of the starburst control component of Table 16. Each composition of Examples 23-52 was in the form of a dry flowable powder suitable for application to a substrate using conventional electrostatic powder coating apparatus.

After post blending, each exemplary wrinkle finish powder coating composition was electrostatically charged and applied to a small size 3.125"×6.250" steel Q-panel with a spray gun in a spray booth. Each coated panel was removed from the spray booth and heated in a convection oven until the coating was melted and cured. Heating time was about 10 minutes at 375° F. The thickness of the coating on each Q-panel following curing ranged between 2.5 and 6.2 mils as noted in each example.

Observations were made of the weight percent of the wrinkle finish powder coating component, starburst control component, starburst-type anomalies formation, gloss, color change and edge pull as noted in each example. Starburst control was evaluated in terms of starbursts observed on the 19.53 square inch surface area of each Q-panel. Gloss measurements were taken of each Q-panel using a Byk Instruments glossmeter (Byk Instruments, Norwalk, Conn.) at an angle of 60 degrees to the coated surface. Color measurements were taken as noted using the X-Rite, Inc. Model 8000 spectrophotometer colorimeter again using the CIELAB method.

Table 17 presents data on selected physical properties of the coating compositions of Examples 23-52.

TABLE 17

Examples 23-32

| Example | Powder Coating Component (Wt. %) | Starburst Control Component (Wt. %) | Starbursts (19.53 inch$^2$ Q-Panel) | Gloss | Thickness (Mils) | Color Difference Δ (vs. Ex. 17) |
|---|---|---|---|---|---|---|
| 23 | 99 | 1 | 1 | 2.6 | 3.0-4.6 | 0.02 |
| 24 | 98 | 2 | 2 | 2.6 | 3.5-6.2 | 0.19 |
| 25 | 97 | 3 | 0 | 2.9 | 2.5-3.7 | 0.24 |
| 26 | 96 | 4 | 0 | 2.6 | 3.5-4.5 | 0.20 |
| 27 | 95 | 5 | 0 | 3.0 | 2.7-3.5 | 0.32 |
| 28 | 94 | 6 | 0 | 2.7 | 2.7-4.0 | 0.23 |
| 29 | 93 | 7 | 0 | 2.9 | 3.5-3.8 | 0.34 |
| 30 | 92 | 8 | 0 | 2.9 | 3.2-3.8 | 0.23 |
| 31 | 91 | 9 | 0 | 2.7 | 3.0-3.7 | 0.47 |
| 32 | 90 | 10 | 0 | 3.5 | 2.7-4.0 | 0.55 |

Examples 23-32

Data and Observations

Starburst anomalies were controlled in each of the ten wrinkle finish powder coating compositions of Examples 23-32 because eight exemplary compositions (examples 25-32) had no starburst anomalies and two exemplary compositions had nominal and commercially acceptable amounts of starburst anomalies (Examples 23-24). Gloss was low in each example.

Color was observed to be consistent in each of the ten Q-panels. Color consistency is confirmed by the colorimeter data which indicates near identity in the color values. As indicated in Table 17, the delta unit difference between Example 17 and each of the coatings of Examples 23-32 was less than one indicating color consistency. No edge pulling was observed. The data show efficacy across a range of coating composition and starburst control component weight percentages. Each of Examples 23-32 are excellent wrinkle finish powder coating compositions.

Examples 33-42

Table 19 presents data on selected physical properties of the coating compositions of Examples 33-42. Table 16 identifies the constituents of the starburst control component used in Examples 33-42. The wrinkle finish powder coating component ranged from 99-90 percent by weight of the composition and the starburst control component ranged from 1 to 10 percent by weight of the composition.

TABLE 19

Examples 33-42

| Example | Powder Coating Component (Wt. %) | Starburst Control Component (Wt. %) | Starbursts (19.53 inch² Q-Panel) | Gloss | Thickness (Mils) | Color Difference Δ (vs. Ex. 17) |
|---|---|---|---|---|---|---|
| 33 | 99 | 1  | 1 | 2.4 | 3.1-3.6 | 0.01 |
| 34 | 98 | 2  | 2 | 3.0 | 3.0-4.0 | 0.09 |
| 35 | 97 | 3  | 1 | 2.9 | 3.0-3.7 | 0.11 |
| 36 | 96 | 4  | 1 | 2.8 | 2.9-3.5 | 0.26 |
| 37 | 95 | 5  | 0 | 3.5 | 3.0-3.4 | 0.22 |
| 38 | 94 | 6  | 0 | 2.4 | 3.0-5.7 | 0.20 |
| 39 | 93 | 7  | 0 | 3.3 | 2.7-3.5 | 0.19 |
| 40 | 92 | 8  | 0 | 3.2 | 3.3-4.9 | 0.22 |
| 41 | 91 | 9  | 0 | 3.1 | 3.5-4.0 | 0.27 |
| 42 | 90 | 10 | 0 | 3.7 | 3.6-4.1 | 0.33 |

Examples 33-42

Data and Observations

Starburst-type anomalies were controlled in each of the ten wrinkle finish powder coating compositions of Examples 33-42.

Color was again observed to be consistent in each of the ten Q-panels. Color consistency is confirmed by the colorimeter data which indicates near identity in the color values. As indicated in Table 19.53, the delta unit difference between Example 17 and each of the coatings of Examples 33-42 was less than one indicating color consistency. No edge pulling was observed. Efficacy is shown across a range of coating composition and starburst control component weight percentages. Each of Examples 33-42 are efficacious wrinkle finish powder coating compositions.

Examples 43-52

Table 20 presents data on selected physical properties of the coating compositions of Examples 43-52. Table 16 identifies the constituents of the starburst control component used in Examples 43-52. The weight percentage of the powder coating component and the starburst control component ranged as presented in Table 20.

Examples 43-52

Data and Observations

Starburst anomalies were controlled in Examples 43-52 as compared to the standard wrinkle finish coating composition of Example 1 with more control observed in Examples 46-48 and 50-52 in which the weight percentage of starburst control component comprised about six or more percent by weight of the composition. The starburst control component did not adversely affect the gloss in any of the ten examples. Gloss was low in each example.

Color was observed to be consistent in each of the ten Q-panels, indicating that the starburst control component did not affect the coating composition color. Color consistency is confirmed by the colorimeter data which indicates that the delta unit difference between Example 17 and each of the coatings of Examples 43-52 was less than one indicating color consistency. No edge pulling was observed.

It is believed that the invention has been described in such detail as to enable those skilled in the art to understand the same and it will be appreciated that variations may be made without departing from the spirit and scope of the invention.

The subject matter claimed is:

1. A wrinkle finish powder coating composition including a starburst control component, the composition consisting essentially of:

TABLE 20

Examples 43-52

| Example | Powder Coating Component (Wt. %) | Starburst Control Component (Wt. %) | Starbursts (19.53 inch² Q-Panel) | Gloss | Thickness (Mils) | Color Difference Δ (vs. Ex. 17) |
|---|---|---|---|---|---|---|
| 43 | 99 | 1  | 16 | 2.6 | 4.0-6.0 | 0.02 |
| 44 | 98 | 2  | 6  | 2.6 | 3.5-4.0 | 0.42 |
| 45 | 97 | 3  | 9  | 2.9 | 2.7-2.9 | 0.39 |
| 46 | 96 | 4  | 3  | 2.6 | 3.4-3.8 | 0.78 |
| 47 | 95 | 5  | 8  | 3.0 | 2.7-5.0 | 0.28 |
| 48 | 94 | 6  | 4  | 2.7 | 2.5-4.0 | 0.69 |
| 49 | 93 | 7  | 15 | 2.9 | 3.5-4.4 | 0.51 |
| 50 | 92 | 8  | 4  | 2.9 | 3.0-3.9 | 0.47 |
| 51 | 91 | 9  | 4  | 2.7 | 3.7-4.2 | 0.75 |
| 52 | 90 | 10 | 2  | 3.5 | 3.2-5.0 | 0.59 | about 80-99.9 weight % of the total composition of a wrinkle finish powder coating component; and
about 0.1-20 weight % of the total composition of a starburst control component including:
about 48-97 weight % of a polyester resin binder;
about 3-43 weight % of a curative;
about 0.2-5 weight % of a flow aid; and
about 0.2-4 weight % of a degassing agent.

2. The composition of claim 1 comprising:
about 96-98 weight % of the wrinkle finish powder coating component; and
about 2-4 weight % of the starburst control component.

3. The composition of claim 1 wherein the wrinkle finish powder coating component comprises a hydroxy-functional resin selected from the group consisting of epoxy, epoxy-polyester, urethane-polyester and TGIC-free polyester resins and combinations thereof.

4. The composition of claim 3 wherein the wrinkle finish powder coating component further comprises a wrinkle modifier component comprising an admixture of tetramethoxymethyl glycoluril and a blocked sulphonic acid.

5. The composition of claim 1 wherein the starburst control component includes about 81-95 weight % of the polyester resin binder.

6. The composition of claim 1 wherein the polyester resin binder comprises a hydroxyl-bearing resin with a hydroxyl number of between about 23-47.

7. The composition of claim 6 wherein the polyester resin binder further has a hydroxyl weight of 1300 to 1450, an acid value of about 11-15, a glass transition temperature of about 65-70° C. and a viscosity of about 65-90 centipoise.

8. The composition of claim 1 wherein the curative is selected from the group consisting of aliphatic polyisocyanate curing agents and amine blocked sulfonic acids and combinations thereof.

9. The composition of claim 1 wherein the starburst control component includes about 4.5-26 weight % of the curative.

10. The composition of claim 1 wherein the flow aid comprises a polyacrylate.

11. The composition of claim 10 wherein the starburst control component includes 0.6-5 weight % of the flow aid.

12. The composition of claim 1 wherein the degassing agent comprises 2-hydroxy-1, 2-diphenylethanone.

13. The composition of claim 12 wherein the starburst control component includes about 0.5-2.4 weight % of the degassing agent.

14. A method of making a wrinkle finish powder coating composition for starburst-type anomaly control comprising:
admixing:
about 48-97 weight % of a polyester resin binder;
about 3-43 weight % of a curative;
about 0.2-5 weight % of a flow aid; and
about 0.2-4 weight % of a degassing agent;
extruding the admixture;
grinding the extruded admixture to form a powder; and
post-blending the powder with a wrinkle finish powder coating composition to produce a wrinkle coating composition for starburst-type anomaly control consisting essentially of about 0.1-20 weight % of the powder and about 80-99.9 weight % of the wrinkle finish powder coating composition.

15. The method of claim 14 wherein the polyester resin binder comprises a hydroxyl-bearing resin with a hydroxyl number of between about 23-47.

16. The method of claim 14 wherein the curative is selected from the group consisting of aliphatic polyisocyanate curing agents and amine blocked sulfonic acids and combinations thereof.

17. The method of claim 14 wherein the flow aid comprises a polyacrylate.

18. The method of claim 14 wherein the degassing agent comprises 2-hydroxy-1, 2-diphenylethanone.

19. The method of claim 14 further comprising, during the extruding step, heating the admixture.

20. The method of claim 19 further comprising sieving the powder to yield an average particle size by weight of between about $42\mu$ to about $47\mu$.

21. A wrinkle finish powder coating composition for forming a film having controlled surface anomalies, the wrinkle finish powder coating composition consisting essentially of:
about 80-99.9 weight % of the total composition of a wrinkle finish powder coating component comprising:
a hydroxy-functional resin selected from the group consisting of epoxy, epoxy-polyester, urethane-polyester and TGIC-free polyester resins and combinations thereof;
a wrinkle forming component in sufficient amount to cause the hydroxy-functional resin to form a film having wrinkles; and
about 0.1-20 weight % of the total composition of an anomaly control component comprising:
about 48-97 weight % of a polyester resin binder;
about 3-43 weight % of a curative;
about 0.2-5 weight % of a flow aid; and
about 0.2-4 weight % of a degassing agent.

22. The composition of claim 21 wherein the wrinkle forming additive comprises tetramethoxymethyl glycoluril and a blocked sulfonic acid.

23. The composition of claim 21 wherein the polyester resin binder comprises a hydroxyl-bearing resin with a hydroxyl number of between about 36 and 42.

24. The composition of claim 21 wherein the curative is selected from the group consisting of aliphatic polyisocyanate curing agents and amine blocked sulfonic acids and combinations thereof.

25. The composition of claim 21 wherein the flow aid comprises a polyacrylate.

26. The composition of claim 21 wherein the degassing agent comprises benzoin.

* * * * *

UNITED STATES PATENT AND TRADEMARK OFFICE
CERTIFICATE OF CORRECTION

| | | |
|---|---|---|
| PATENT NO. | : 7,585,908 B1 | Page 1 of 1 |
| APPLICATION NO. | : 11/063517 | |
| DATED | : September 8, 2009 | |
| INVENTOR(S) | : James | |

It is certified that error appears in the above-identified patent and that said Letters Patent is hereby corrected as shown below:

In column 4, line 12, delete "KD-41" and insert --KD-410--.

In column 4, line 24, delete "coatings" and insert --coating--.

In column 4, line 28, delete "D-410J" and insert --KD-410J--.

In column 13, Table 7, line 50, delete "2.1-23" and insert --2.1-2.3--.

In column 19, lines 60-61, delete "Instruments" and insert --Gardner--.

In column 22, line 10, delete "Instruments" and insert --Gardner--.

Signed and Sealed this

Twelfth Day of October, 2010

David J. Kappos
*Director of the United States Patent and Trademark Office*